J. H. SMITH AND GEORGE O. SMITH, OF CHICAGO, ILLINOIS.

*Letters Patent No. 84,011, dated November 10, 1868.*

IMPROVED PAINT FOR BUILDINGS, ROOFS, &c.

The Schedule referred to in these Letters Patent and making part of the same.

*To all whom this may concern:*

Be it known that we, J. H. SMITH and GEORGE O. SMITH, of Chicago, in the county of Cook, and State of Illinois, have invented a new and improved Paint; and we do hereby declare that the following is a full, clear, and exact description of the ingredients which compose the same, and the manner of compounding them.

The present invention relates to a paint which is to be used more especially for stopping leakages, outside covering, and for other similar purposes, where a cheap "water and fire-proof paint" is required; and its nature consists in the combination of new ingredients for this purpose, whereby a paint of superior quality and cheapness is produced, as hereinafter shown.

The ingredients are leached ashes, coal-tar, water-lime, (hydraulic cement,) and benzine.

We put one gallon of coal-oil in any suitable vessel, and add to it one pint of water-lime. This mixture is then thoroughly incorporated, and allowed to stand for ten minutes or more, until it ceases to foam. It is then thinned with one pint of benzine, after which one-half pint of fine leached ashes is thoroughly incorporated in the mixture, and the paint is then ready for use.

The component parts of water-lime, coal-tar, and benzine are well understood, but those of leached ashes are not, therefore it is deemed necessary to give the following analysis:

One hundred pounds of well-leached ashes are found to contain, as a general rule, silica, seventy-four parts; phosphoric acid, four parts; lime and carbonate of lime, five parts; magnesia, three parts; peroxides of iron and manganese, four parts; potash, five parts; soda, two parts; chlorine, one-half part; sulphuric acid, two parts; carbonic acid, one-half part.

Of course there is a difference in the component parts of ashes burned from different kinds of hard wood, but this is small and immaterial. Any clean ashes which are leached down so as to contain from five to eight per cent. of potash, are found to well answer the purpose; but, if a greater amount of potash is used, there is a tendency to saponify the oils in the other ingredients. A small quantity, however, is necessary to neutralize the volatile oils before the paint is applied for use.

The silica found in the ashes is in a very fine powder, and it forms a body with the other ingredients, which is very permanent. The other parts of the ashes form a chemical union, also, with coil-tar, lime, and benzine, and thereby provide a paint which may stand a considerable length of time before it is used.

The lime and ashes should be sifted through a fine sieve before being compounded, and if a very fine paint is required, the mixture can be run through a mill used for this purpose.

The paint is applied for use with a brush or otherwise, similarly as other paints are put on.

Having thus fully described our invention,

What we claim, and desire to secure by Letters Patent of the United States, is—

A paint composed of the ingredients herein named, and compounded substantially as herein set forth.

J. H. SMITH.
GEO. O. SMITH.

Witnesses:
 P. A. HOYNE,
 A. T. SHERMAN.